United States Patent [19]

Ishihara et al.

[11] 4,214,057
[45] Jul. 22, 1980

[54] COATING COMPOSITION FOR PLASTIC SUBSTRATES

[75] Inventors: Shunichi Ishihara, Chiba; Toraichi Katsube, Kawasaki, both of Japan

[73] Assignee: Asahi Kasei Kogyo Kabushiki Kaisha, Osaka, Japan

[21] Appl. No.: 877,934

[22] Filed: Feb. 15, 1978

[51] Int. Cl.² .................... C08L 83/06; C08L 33/06
[52] U.S. Cl. ............................. 525/100; 260/31.2 R; 260/33.4 SB; 260/33.6 SB; 260/33.8 SB; 427/393.5; 428/447
[58] Field of Search ................. 260/827, 825; 525/100

[56] References Cited

U.S. PATENT DOCUMENTS

| | | | |
|---|---|---|---|
| 2,404,357 | 7/1946 | Bechtold | 260/827 |
| 2,698,314 | 12/1954 | Rust | 260/827 |
| 3,849,357 | 11/1974 | Wolf | 260/827 |
| 3,894,881 | 7/1975 | Suzuki et al. | 106/287 SB |

*Primary Examiner*—Wilbert J. Briggs, Sr.
*Attorney, Agent, or Firm*—Sprung, Felfe, Horn, Lynch & Kramer

[57] ABSTRACT

A coating composition comprising (A) a hydrolyzed product obtained from a tetraalkoxysilane, (B) a hydrolyzed product obtained from a silicon compound of the formula, R'Si(OR")$_3$, wherein R' and R" are as defined in the specification, and (C) a poly(vinyl acetate) resin gives excellent physical and chemical properties such as hardness, wear resistance, scratch resistance, etc., to the coated film, when it is coated on shaped articles particularly made from plastics such as methacrylate resins.

9 Claims, 1 Drawing Figure

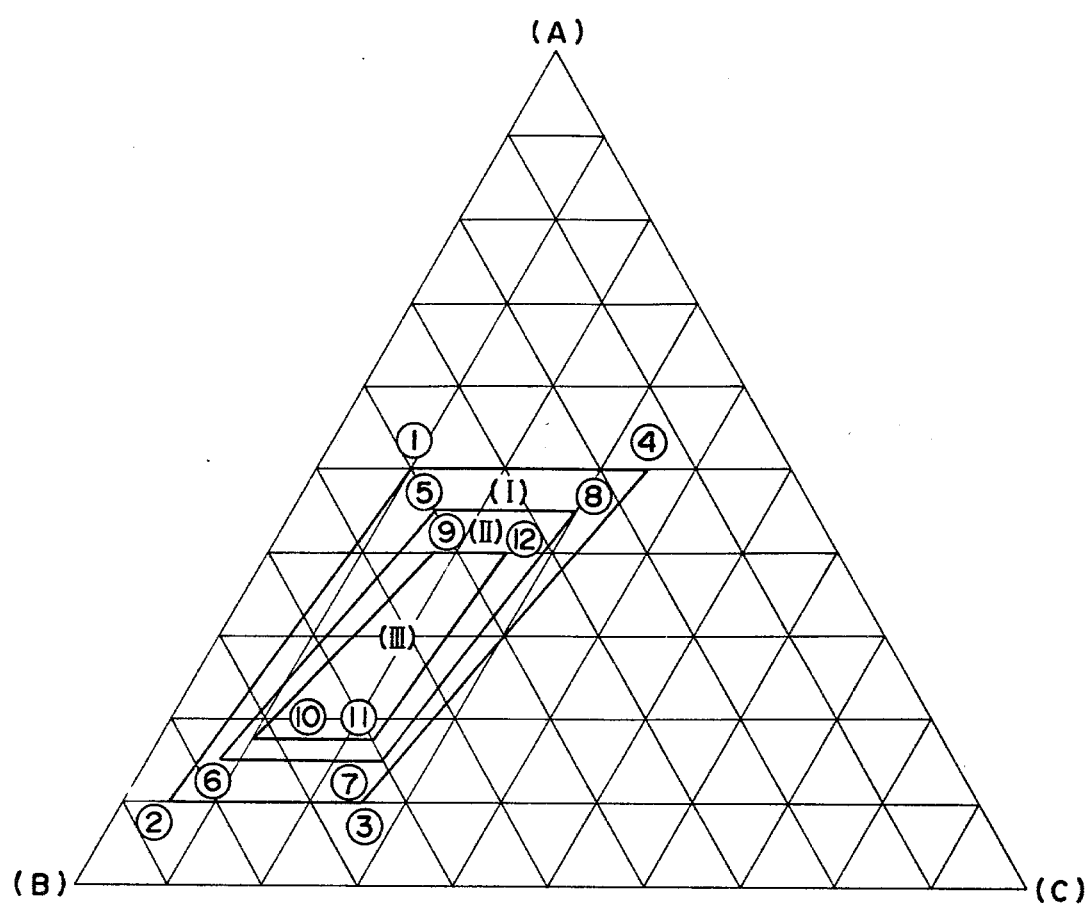

COATING COMPOSITION FOR PLASTIC SUBSTRATES

BACKGROUND OF THE INVENTION

This invention relates to a coating composition, particularly for plastic substrates, and preparation and use thereof. More particularly this invention relates to a coating composition for forming a protective coating which provides excellent surface properties such as hardness, wear resistance and scratch resistance on the surfaces of shaped articles particularly made from plastics, a process for preparing said composition, a method for coating the surfaces of shaped articles particularly made from plastics, and the shaped articles thus coated.

Plastic shaped articles are widely used because of their advantages in good processability, light weight, impact resistance, and the like, but the range of their use is limited due to relatively low surface hardness and easiness in being scratched. Particularly scratches are conspicuous in plastic shaped articles having good transparency, so that improvement of this defect has strongly been desired.

In order to improve such a defect, various coating compositions and methods for coating these coating compositions have been proposed. For example, there have been disclosed (1) a method for coating hydrolyzed products obtained from methyltrialkoxysilane and phenyltrialkoxysilane (U.S. Pat. No. 3,451,838L), (2) a method for coating a composition comprising a hydrolyzed product obtained from ethyl silicate and poly(vinyl acetate) resin (U.S. Pat. No. 2,404,357), (3) a method for coating a composition comprising a hydrolyzed product obtained from tetraalkoxysilane, a hydrolyzed product obtained from alkyl trialkoxysilane, and an alkali metal salt of organic carboxylic acid (U.S. Pat. No. 3,894,881), and the like. But these methods have respective defects and give no fully satisfactory results in practical use. The method (1) has defects in that the coating solution has short pot life, handling of the coating solution is difficult for the producer and there is insufficiently in hardness. The method (2) has defects in that coated film is poor in water resistance and hardness, it is practically very difficult to select a composition having good properties, since if the proportion of the hydrolyzed ethyl silicate in the composition of hydrolyzed ethyl silicate and poly(vinyl acetate) becomes large in order to increase hardness, cracks are easily produced with the lapse of time, and if the proportion of the poly(vinyl acetate) becomes large in order to prevent the production of cracks, water resistance becomes poor and hardness becomes insufficient. The method (3) has a defect in that there is a tendency to produce micro-cracks on coated film. Other methods for forming hard coating films on the surfaces of plastic shaped articles by using organic silicon compounds and curing with heating have also been proposed, but these methods have at least one defect among the following defects, i.e. it requires a high temperature and a long period of time for curing, pot life of a coating solution is short, coated film becomes white, coated film has poor water resistance, coated film has poor adhesion to a substrate, there is a tendency to generate cracks with the lapse of time (the most unpreferable defect), and the like. Therefore, there has been desired a composition for coating plastic shaped articles overcoming these defects mentioned above.

SUMMARY OF THE INVENTION

It is an object of this invention to provide a coating composition having excellent physical and chemical properties overcoming the defects of the known coating compositions. It is another object of this invention to provide a process for preparing said coating composition. It is a further object of this invention to provide a method for coating the surfaces of shaped articles using said coating composition. Further objects and advantages of this invention will be apparent to one skilled in the art from the accompanying disclosure and discussion.

In accordance with this invention, there is provided a coating composition comprising
  (A) 10 to 50% by weight of at least one hydrolyzed product obtained from one or more tetraalkoxysilanes of the formula:

$$Si(OR)_4 \qquad (I)$$

wherein R is an alkyl group having 1 to 4 carbon atoms,
  (B) 15 to 85% by weight of at least one hydrolyzed product obtained from one or more silicon compounds of the formula:

$$R'Si(OR'')_3 \qquad (II)$$

wherein R' is a hydrocarbon group having 1 to 2 carbon atoms; and R'' is a substituted or unsubstituted hydrocarbon group having 1 to 3 carbon atoms or an acyl group having 1 to 3 carbon atoms, and
  (C) 5 to 35% by weight of a poly(vinyl acetate) resin.

BRIEF DESCRIPTION OF DRAWING

The drawing is a triangular diagram showing preferred ranges of the components (A), (B) and (C).

DETAILED DESCRIPTION OF THE INVENTION

The coating composition of this invention and the preparation thereof will be explained in detail hereinafter.

The component (A) is at least one hydrolyzed product obtained from one or more tetraalkoxysilanes of the formula (I). Examples of the tetraalkoxysilanes are tetramethoxysilane, tetraethoxysilane, tetrapropoxysilane, tetrabutoxysilane, and the like. Two or more tetraalkoxysilanes of the formula (I) having different carbon numbers as the symbol R may be used in combination.

The component (B) is at least one hydrolyzed product obtained from one or more silicon compounds of the formula (II). In the formula (II), the symbol R' is a hydrocarbon group such as an alkyl group having 1 to 2 carbon atoms, a vinyl group, and the like; and the symbol R'' is a substituted or unsubstituted hydrocarbon group such as an alkyl group, which can be substituted by an alkoxy group, having 1 to 3 carbon atoms, a vinyl group, or an acyl group having 1 to 3 carbon atoms. Particularly preferred examples of the silicon compounds of the formula (II) are methyltrimethoxysilane, vinyltrimethoxysilane, vinyltriethoxysilane, vinyltris($\beta$-methoxyethoxy)silane, and the like. Two or more silicon compounds of the formula (II) may be used in combination.

In order to obtain the components (A) and (B), the silicon compounds of the formulae (I) and (II) are hydrolyzed separately or in combination. The hydrolysis can be carried out, for example, as follows. To 1 mole of a tetraalkoxysilane of the formula (I) and/or a silicon compound of the formula (II), 1.5 to 6 moles of water as a 0.01–0.1 N hydrochloric acid aqueous solution is added and stirred for 1 to 4 hours. Then, the mixture is left to stand at 10°–30° C. for from several hours to several days for ageing to give the desired hydrolysis products of the silicon compounds. The hydrolysis can also be carried out in the presence of the component (C), a poly(vinyl acetate) resin, and/or a solvent as explained in detail hereinafter such as methyl alcohol, ethyl alcohol, ethyl acetate or the like.

The component (C) is a poly(vinyl acetate) resin. The poly(vinyl acetate) resin used in this invention includes a homopolymer of vinyl acetate, copolymers of vinyl acetate and one or more other polymerizable monomers, and a resin mixture obtained by blending a poly(vinyl acetate) resin with a minor proportion of one or more other resins such as poly(methyl methacrylate), poly(methyl acrylate), copolymer of methyl acrylate and butyl acrylate, or the like. Among them, a homopolymer of vinyl acetate is preferable. Particularly a poly(vinyl acetate) resin having a degree of polymerization of about 200 to 700 obtained by solution polymerization using methyl alcohol, ethyl alcohol, ethyl acetate or the like as a solvent is more preferable. This poly(vinyl acetate) resin together with the solvent mentioned above has excellent compatibility with a solution or solutions of hydrolyzed products obtained from the silicon compounds of the formulae (I) and (II).

The coating composition of this invention can be prepared by mixing the component (A) separately hydrolyzed, the component (B) separately hydrolyzed, and the component (C) in prescribed proportions. A more advantageous process for preparing the coating composition of this invention is to hydrolyze a mixture containing a tetraalkoxysilane of the formula (I), a silicon compound of the formula (II), and a poly(vinyl acetate) resin, the component (C), in the presence of a solvent as explained in detail hereinafter so as to give the desired composition at one action.

Proportions of the three components (A), (B) and (C) in percents by weight are very important in this invention. The proportions are limited so that the resulting coating, i.e. the coated film shows excellent properties which are required as essential properties such as surface hardness, crack resistance, flexibility, ageing resistance, and adhesion to the substrate. The attached drawing shows preferred proportions of the three components using a triangular diagram. In the drawing, (A), (B) and (C) represent the components (A), (B), and (C), respectively, wherein (A) is calculated as $SiO_2$ and (B) is calculated as $R'SiO_{1.5}$. Preferable proportions of the components (A), (B), and (C) are in the area [I] which is encircled by the lines drawn from point ① to point ② to point ③ to point ④ and to point ①. Each point has the following values of (A):(B):(C), i.e. ① 50:40:10, ② 10:85:5, ③ 10:65:25, and ④ 50:15:35. More preferable proportions of the components (A), (B), and (C) are in the area [II] which is encircled by the lines drawn between points ⑤, ⑥, ⑦, ⑧ and ⑤, each point having the values of (A):(B):(C) as follows: ⑤ 45:40:15, ⑥ 15:77.5:7.5, ⑦ 15:60:25 and ⑧ 45:25:30. The most preferable proportions of the components (A), (B) and (C) are in the area [III] which is encircled by the lines drawn between points ⑨, ⑩, ⑪, ⑫ and ⑨, each point having the values of (A):(B):(C) as follows: ⑨ 40:42.5:17.5, ⑩ 17.5:72.5:10, ⑪ 17.5:60:22.5, and ⑫ 40:35:25.

If the proportion of the component (A) is more than that in the area [I], hardness of the coated film becomes larger, but cracks are easily generated on the coated film. On the other hand, if the proportion of the component (A) is less than that in the area [I], hardness of the coated film is practically insufficient and the curing rate becomes slow. Selection of proper proportions of the components (A) and (B) from the limited range as mentioned above is very important for satisfying both hardness of the coated film and adhesion of the coated film to the substrate.

Further the component (C) increases stability of the coated film with the lapse of time by imparting stable adhesion to the coated film obtained by curing the composition of this invention to the substrate (e.g. shaped articles of plastics) irrespective of the lapse of time and also imparting flexibility to the cured coated film. In order to attain such objects, the proportion of the component (C) should be in the claimed range, particularly in the area [I]. If the proportion of the component (C) is more than that in the area [I], hardness and water resistance of the coated film are lowered, while if the proportion is less than that in the area [I], adhesion to the substrate with the lapse of time is lowered and microcracks are generated on the coated film.

In order to obtain protective coatings, the composition comprising the components (A), (B) and (C) is cured with heating by using a curing catalyst. As the curing catalyst, there may be used acids, alkalis and amines which can condense and cure the hydrolyzed products obtained from the silicon compounds mentioned above. Examples of the curing catalysts are inorganic and organic acids such as hydrochloric acid, paratoluenesulfonic acid, and the like; metal salts of fatty acids such as Zn, Co and Sn salts of octenate, and naphthenate; alkali metal salts such as sodium thiocyanate, sodium acetate, and the like; aliphatic polyamines such as triethanolamine, choline hexoate, triethylenetetramine, tetraethylenepentamine, and the like; quaternary ammonium salts such as tetramethylammonium hydroxide, trimethylbenzylammonium hydroxide, and the like; cyclic amines such as tetrabutyl phosphonium hydroxide, 1,8-diazabicyclo(5,4,0)-undecene-7, and the like. These curing catalysts may be used alone or as a mixture of two or more curing catalysts. Sometimes, suitable curing temperatures are changed depending on the kinds and amounts of curing catalysts used, whitening appears when the thickness of the coating is large, adhesion to the substrate is lowered, and the solubility becomes poor depending on solvents used. Among these curing catalysts, preferable ones are sodium acetate, sodium thiocyanate, triethylenetetramine, trimethylbenzylammonium hydroxide, 1,8-diazabicyclo(5,4,0)-undecene-7 or their salts. More preferable curing catalysts are trimethylbenzylammonium hydroxide, 1,8-diazabicyclo(5,4,0)undecene-7 and their salts. The last two compounds have large solubilities to various solvents and are excellent as condensing curing catalysts for the hydrolyzed products obtained from the silicon compounds used in the present composition. The salts of the last two compounds obtained by reacting with relatively highly volatile acids such as formic acid, acetic acid, carbonic acid, hydrochloric acid and the like in equal amount are good latent curing catalysts which can be handled easily.

The amount of the curing catalyst to be added to the coating composition of this invention is changed depending on the kind of catalyst used, curing temperatures required, curing time required, and the like but in general, the curing catalyst is used in an amount of about 0.1 to 20 parts by weight, preferably 0.2 to 10 parts by weight, more preferably 0.5 to 5 parts by weight per 100 parts by weight of the total of the components (A) and (B).

A solvent can be added to the components (A), (B) and (C) and the curing catalyst which is added if required in order to dissolve these components uniformly without forming gelation, so that wetting of the surface of substrate increases, uniform curing reaction is carried out and excellent cured coating having uniform physical and chemical properties is obtained. Examples of preferable solvents are lower alcohols having 1 to 4 carbon atoms such as ethyl alcohol, isopropyl alcohol, butyl alcohol, and the like; acetic acid and its esters such as ethyl acetate, butyl acetate, amyl acetate, and the like; ketones such as methyl ethyl ketone, methyl isobutyl ketone, and the like; Cellosolves such as ethyl Cellosolve, butyl Cellosolve, Cellosolve Acetate, and the like; aromatic hydrocarbons such as toluene, xylene, and the like; chlorinated hydrocarbons such as trichloroethylene, chloroform, carbon tetrachloride, and the like; and nitroethane, nitropropane, and the like. These solvents can be used alone or as a mixture of two or more. The solvent is preferably used so as to make the concentration of the components (A), (B) and (C) and the curing catalyst 5 to 30%. The solvent can be added to the silicon compound (tetraalkoxysilane) of the formula (I) and/or the silicon compound of the formula (II) before the hydrolysis and then these silicon compounds can be hydrolyzed in the presence of the solvent.

A tough coating can be formed on the surface of substrate either by immersing the substrate in a solution containing the composition of this invention, a curing catalyst and a solvent, or by coating the solution on the substrate by using a brush, or by using a spray method, a flow coating method, or the like, and curing with heating, preferably at a temperature of 60° to 140° C. (if the substrate is made from a thermoplastic resin, the temperature is below the glass transition temperature of the resin).

Substrates which can be coated by the composition of this invention are, for example, shaped articles of plastics, particularly those having transparency, such as methacrylate resins, polycarbonate resins, diethylene glycol bisalkali carbonate resins, polystyrene resins, AS (acrylonitrile-styrene copolymer) resins, ABS (acrylonitrile-butadiene-styrene copolymer) resins, unsaturated polyester resins, acetate resins, diallyl phthalate resins, and the like. Shaped articles of other thermoplastic resins and thermosetting resins can also be used as substrates. Further other substrates made of glass, ceramics, metals such as aluminum, and woods can also be used, if desired. Among them, those made from methacrylate resins are most preferable from viewpoints of surface hardness and adhesion to the substrate of the coating.

The composition of this invention may further contain a very small amount of a block or graft copolymer of dimethyl siloxane and alkylene oxide in order to increase smoothness of the coating at the coating time and to decrease friction coefficient of the surface of the coating. Further dyes and pigments, a light stabilizer, a heat stabilizer, fillers, and other conventional additives can be added to the coating composition of this invention so far as not to lower the excellent properties of the coating.

In the following examples, the preparation of the coating compositions of this invention and effects of the coatings obtained therefrom will be explained in detail, in which all the parts and percents are by weight unless otherwise specified.

In the following examples, physical properties of the coatings were tested and evaluated as follows.

Appearance:
Appearance was observed with the naked eyes.

Adhesion:
Adhesion was evaluated by a conventional cross cut test.

Pencil hardness:
Pencil hardness was tested according to JIS-K5651.

Scratch resistance (Steel wool test):
The surface was rubbed with No. 000 steel wool, then the degree of scratch was graded as follows:
A: No scratch despite of strong rubbing.
B: Slight scratches after strong rubbing.
C: Considerable scratches after strong rubbing but no scratch after soft rubbing.
D: Considerable scratches after soft rubbing.
E: Severe scratches after soft rubbing.

Hot water resistance:
After immersing a sample in water maintained at 70° C. for 1 hour, the surface of the coated film was evaluated as follows:
O: No change.
Δ: Slightly changed.
X: Clear swelling spots.

Mar scratch resistance (Falling sand test):
The test was carried out according to ASTM-D 673-44. Haze value was obtained from transmission and diffusion coefficient at λmax=570 mμ after falling sand on the surface of a sample. Gloss retention was obtained from specular reflections of 45°×45° before and after falling sand.

Ageing resistance:
(a) Weathering test: After treating a sample in a sunshine weather meter for 400 hours, properties of the surface were compared before and after the weathering test.
(b) Cooling and heating cycle test: A sample plate of 12 cm×5 cm×0.2 cm given 1% bending strain along the length was subjected to cooling and heating cycles, one cycle being heating at 80° C. for 2 hours, being left to stand at room temperature for 2 hours and cooling at −15° C. for 2 hours, and changes on the surface were evaluated.

EXAMPLE 1

Tetraethoxysilane, methyltrimethoxysilane and poly(vinyl acetate) resin (degree of polymerization 450; solvent, methanol; manufactured by Saiden Kagaku Co., Ltd., trade name Saivinol SA5L) were mixed in various proportions. To 100 parts of a mixture, 70 parts of a mixture of ethyl alcohol/glacial acetic acid (weight ratio 80/20) was added and further 30 parts of 0.05 N hydrochloric acid aqueous solution was added thereto with stirring. This addition accompanied generation of heat of the resulting mixture, that is, the reaction began, so that the temperature of the solution was controlled at 20°–50° C. After stirring for about 1 hour, the solution was left to stand at 15°–20° C. overnight to age. Thus, compositions having the components (A), (B) and (C) in various proportions as listed in Table 1 were obtained. To 100 parts of a solution containing each composition as listed in Table 1, 2 parts of 1,8-diazabicyclo(5,4,0)-undecene-7 was added to prepare a coating solution.

The thus obtained coating solution was coated on a methyl methacrylate resin extruded plate (manufactured by Asahi Kasei Kogyo Kabushiki Kaisha, trade name Deraglass A) and cured by heating at 80° C. for 2 hours. Surface properties of the coated plate were tested with the results as shown in Table 1.

nol SA5L manufactured by Saiden Kagaku Co., Ltd.) were mixed in various proportions so as to give compositions as listed in Table 3 after the hydrolysis. To 100 parts of a mixture, 100 parts of a mixed solvent of ethyl alcohol/butyl alcohol/Cellosolve/glacial acetic acid (weight ratio 55/20/10/15) was added to give a solution. The solution was maintained at 20° C. and 25 parts of 0.05 N hydrochloric acid aqueous solution was added thereto. The temperature of the solution was raised to 45° C. temporarily by the heat of reaction. After stirring for about 2 hours, the reaction solution was left to stand Table 1

| Run No. | Composition (%) (A) | (B) | (C) | Appearance | Adhesion | Pencil hardness | Scratch resistance | Hot water resistance | Ageing resistance after 10 cycles of cooling and heating Appearance | Adhesion |
|---|---|---|---|---|---|---|---|---|---|---|
| 1 | 50 | 40 | 10 | Good | 100/100 | 8H | A | | Hair cracks | 70/100 |
| 2 | 50 | 15 | 35 | " | " | 6H | C | Δ | Good | 100/100 |
| 3 | 45 | 40 | 15 | " | " | 7H | A | | " | 80/100 |
| 4 | 45 | 25 | 30 | " | " | 6H | B | Δ | " | 100/100 |
| 5 | 40 | 42.5 | 17.5 | " | " | 7H | A | | " | " |
| 6 | 40 | 35 | 25 | " | " | 7H | B | Δ | " | " |
| 7 | 35 | 45 | 20 | " | " | 7H | B | | " | " |
| 8 | 30 | 50 | 20 | " | " | 7H | B | | " | " |
| 9 | 17.5 | 72.5 | 10 | " | " | 6H | B | | " | " |
| 10 | 22.5 | 60 | 17.5 | " | " | 7H | B | | " | " |
| 11 | 17.5 | 60 | 22.5 | " | " | 6H | B | Δ | " | " |
| 12 | 15 | 72.5 | 7.5 | " | " | 6H | B | | " | 90/100 |
| 13 | 15 | 60 | 25 | " | " | 5H | B | Δ | " | 100/100 |
| 14 | 10 | 85 | 5 | " | " | 5H | B | | " | 80/100 |
| 15 | 10 | 65 | 25 | " | " | 5H | C | Δ | " | 100/100 |

Note:
(A) Hydrolyzed product obtained from tetraethoxysilane (calculated as $SiO_2$)
(B) Hydrolyzed product obtained from methyltrimethoxysilane (calculated as $CH_3SiO_{1.5}$)
(C) Poly(vinyl acetate)

COMPARATIVE EXAMPLE 1

Using the procedure of Example 1 but changing the proportions of the components (A), (B) and (C) as listed in Table 2, each coating solution as listed in Table 2 outside the scope of this invention was prepared. The coating solution was coated on a methyl methacrylate resin plate and cured in the same manner as described in Example 1. Surface properties of the coated plate were as listed in Table 2.

at 20° C. for 1 day to age. After ageing, 4 parts of 1,8-diazabicyclo(5,4,0)undecene-7 as a curing catalyst was added to the solution based on 100 parts of the silicon compounds with stirring to give a coating solution.

A plate having smooth surfaces molded as a meter cover of 10 cm×8 cm×0.2 cm made from methyl methacrylate resin (manufactured by Asahi Kasei Kogyo Kabushiki Kaisha, trade name Delpet) was immersed in the coating solution for about 30 seconds and then it was pulled up slowly. The coated plate was Table 2

| Run No. | Composition (%) (A) | (B) | (C) | Appearance | Adhesion | Pencil Hardness | Scratch Resistance | Hot water Resistance | Ageing resistance after 10 cycles of cooling and heating Appearance | Adhesion |
|---|---|---|---|---|---|---|---|---|---|---|
| 1 | 50 | 5 | 45 | Good | 100/100 | 5H | C | X | Good | 100/100 |
| 2 | 40 | 57.5 | 2.5 | " | 60/100 | 8H | D | | Cracks | 0/100 |
| 3 | 5 | 95 | 0 | " | 40/100 | 5H | D | | " | 0/100 |
| 4 | 5 | 60 | 35 | " | 100/100 | 4H | D | X | " | 100/100 |

Note:
(A), (B) and (C) are the same as those of Example 1.

EXAMPLE 2

Tetraethoxysilane (containing 28.8% on the $SiO_2$ basis), vinyltriethoxysilane (containing 41.5% on the $CH_2=CH-SiO_{1.5}$ basis) and poly(vinyl acetate) resin (degree of polymerization 450; solvent, methanol; Saivicured in a drier using heated air at 80° C. for 2 hours. Surface properties of the coated plate were tested. Ageing resistance of the film was also tested by using a sunshine weather meter, in which the coated plate was tested for 400 hours, and after 20 cycles of cooling and heating test. The results were as shown in Table 3.

Table 3

| | Composition % | | | Surface properties of the coated plate (original) | | | Ageing Resistance | | |
|---|---|---|---|---|---|---|---|---|---|
| | | | | | | | After 20 cycles of cooling & heating | After 400 hours' weathering test | |
| Run No. | (A) | (B) | (C) | Appearance | Adhesion | Pencil hardness | Appearance | Appearance | Adhesion |
| 1 | 32 | 58 | 10 | Good | 100/100 | 7H | Good | Good | 100/100 |
| 2 | 30 | 46 | 24 | " | " | 6H | " | " | " |
| 3 | 20 | 70 | 10 | " | " | " | " | " | " |
| 4 | 20 | 57 | 23 | " | " | " | " | " | " |
| 5 | 15 | 71 | 14 | " | " | 5H | " | " | " |

Note
(A) Hydrolyzed product obtained from tetraethoxysilane (calculated as $SiO_2$)
(B) Hydrolyzed product obtained from vinyltriethoxysilane (calculated as $CH_2=CHSiO_{1.5}$)
(C) Poly(vinyl acetate)

COMPARATIVE EXAMPLE 2

Using the procedure of Example 2 but changing the proportions of the components (A), (B) and (C) as listed in Table 4, each coating solution as listed in Table 4 outside the scope of this invention was prepared and tested. The results were as shown in Table 4.

Table 4

| | Composition % | | | Surface properties of the coated plate (original) | | | Ageing resistance | | |
|---|---|---|---|---|---|---|---|---|---|
| | | | | | | | After 20 cycles of cooling & heating | After 400 hours' weathering test | |
| Run No. | (A) | (B) | (C) | Appearance | Adhesion | Pencil hardness | Appearance | Appearance | Adhesion |
| 1 | 56 | 44 | 0 | Cracks | — | 8H | — | — | — |
| 2 | 60 | 21 | 19 | Good | 80/100 | " | Cracks | Cracks | — |
| 3 | 46 | 9 | 45 | " | 100/100 | " | Hair cracks | Whitened | — |
| 4 | 32 | 68 | 0 | " | " | 7H | Good | Good | 10/100 |
| 5 | 7 | 93 | 0 | " | " | 5H | " | " | 10/100 |

Note:
(A), (B) and (C) are the same as those of Example 2.

EXAMPLE 3

To a mixture of 40 parts of tetraethoxysilane (12 parts of $SiO_2$ as a hydrolyzed product of tetraethoxysilane) and 52.5 parts of methyltrimethoxysilane (26 parts of $CH_3SiO_{1.5}$ as a hydrolyzed product of methyltrimethoxysilane), 60 parts of ethyl alcohol and 15 parts of butyl acetate were added and mixed. To the resulting solution, 30 parts of 0.01 N hydrochloric acid aqueous solution was added with stirring. After the evolution of heat was repressed, the solution was placed in a refrigerator kept at about 15° C. for 4 days for ageing. The temperature of the aged solution was raised to 20° C. and 7.5 parts of the same poly(vinyl acetate) resin as used in Example 1 was added thereto and mixed. To the resulting mixture, each curing catalyst as listed in Table 5 was added to prepare a coating solution.

The same methyl methacrylate resin plate as used in Example 1 (manufactured by Asahi Kasei Kogyo Kabushiki Kaisha, trade name Deraglass A) was immersed in the coating solution for about 30 seconds and then it was pulled up slowly. The coating was cured at 80° C. for prescribed time and surface properties thereof were tested. The results were as shown in Table 5.

Table 5

| Run No. | Curing catalyst Name | | Amount (parts) | Heating time (hrs) | Surface properties of the coated plate | | | |
|---|---|---|---|---|---|---|---|---|
| | | | | | Appearance | Adhesion | Pencil hardness | Scratch resistance |
| 1 | Sodium acetate | | 2.0 | 2 | Good | 100/100 | 6H | B — C |
| | | | | 4 | " | " | 7H | B |
| 2 | Sodium thiocyanate | | 2.0 | 2 | Good | 100/100 | 6H | B — C |
| | | | | 4 | " | " | 7H | B |
| 3 | Triethylenetetramine | | 3.0 | 2 | Good | 100/100 | 6H | B — C |
| | | | | 4 | " | " | 6H | B |
| 4 | 1,8-Diazabicyclo-(5,4,0)undecene-7 | | 2.0 | 2 | Good | 100/100 | 7H | A — B |
| | | Carbonate | 2.0 | 2 | " | " | 7H | A — B |
| | | Acetate | 2.0 | 2 | " | " | 7H | A — B |
| | | Hydrochloride | 2.0 | 2 | " | " | 7H | B |
| 5 | Trimethylbenzylammonium hydroxide | | 2.0 | 2 | Good | 100/100 | 7H | B |
| | | Acetate | 2.0 | 2 | " | " | 7H | B |

EXAMPLE 4

In a mixture of 60 parts of ethyl alcohol, 15 parts of butyl acetate, 30 parts of ethylene dichloride and 10 parts of acetic acid, was dissolved 40 parts of tetraethoxysilane (12 parts of $SiO_2$ as a hydrolyzed product of tetraethoxysilane), 50 parts of vinyltris(β-methoxyethoxy)silane (14 parts of CH$_2$=CHSiO$_{1.5}$ as a hydrolyzed product of vinyltris(β-methoxyethoxy)silane), and 20 parts of 50% methyl alcohol solution of poly(vinyl acetate) (the same one as used in Example) and 25 parts of 0.1 N hydrochloric acid aqueous solution was added thereto with stirring. After continuing the stirring for 1 hour, the solution was left to stand at room temperature overnight for ageing. To the aged solution, 3 parts of trimethylbenzylammonium hydroxide (40% methyl alcohol solution) was added and mixed for 30 minutes to prepare a coating solution.

A methyl methacrylate resin plate obtained by casting (trade name, Deraglass K manufactured by Asahi Kasei Kogyo Kabushiki Kaisha), a molded plate of polycarbonate (trade name, Panlight 1225, manufactured by Teijin Chemical Co.), a molded plate of ABS resin (trade name, Toyolac, manufactured by Toray Industries, Inc.), a molded plate of unsaturated polyester (trade name, Polymaru 8235-A manufactured by Takeda Chemical Industries, Ltd.) each plate having 3 mm thick, were immersed in the coating solution for about 30 seconds, pulled up slowly, and cured at 100° C. for 1 hour in the case of the polycarbonate plate and the methacylate plate, at 80° C. for 2 hours in the case of the ABS resin plate and the unsaturated polyester plate. Surface properties of the individual coated plates were as shown in Table 6. For comparison, uncoated individual plates were also tested in the same manner and the results were also listed in Table 6.

Table 6

| Items of surface properties | Methyl methacrylate resin casting plate Uncoated | Methyl methacrylate resin casting plate Coated | Polycarbonate plate Uncoated | Polycarbonate plate Coated | ABS resin plate Uncoated | ABS resin plate Coated | Unsaturated polyester plate Uncoated | Unsaturated polyester plate Coated |
|---|---|---|---|---|---|---|---|---|
| Surface appearance | — | Good | — | Good | — | Good | — | Good |
| Adhesion | — | 100/100 | — | 100/100 | — | 100/100 | — | 100/100 |
| Pencil hardness | 3H | 7H | HB | 5H* | F | 5H* | 3H | 7H |
| Scratch resistance (Steel wool test) | D | A —B | D | A | D | B | D | B |
| Mar scratch resistance (Falling sand test) | | | | | | | | |
| Transmission (%) | 92 | 92 | 84 | 87 | 74 | 76 | 80 | 81 |
| Retention of transmission after the test (%) | 47 | 95 | 26 | 98 | 13 | 92 | 24 | 90 |
| Specular gloss (%) | 75 | 95 | 74 | 89 | 39 | 85 | 74 | 80 |
| Retention of gloss after the test (%) | 11 | 92 | 6 | 95 | 5 | 86 | 7 | 82 |

Note:
*Correct value could not be measured, since the surface was not damaged but hollowed.

What is claimed is:
1. A coating composition consisting essentially of:
   (A) the hydrolyzed product of a tetraalkoxysilane of the formula

$$Si(OR)_4 \quad (I)$$

wherein R is an alkyl group of 1 to 4 carbon atoms
   (B) the hydrolyzed product of one or more silicon compounds of the formula $$R'Si(OR'')_3 \quad (II)$$

wherein R' is a hydrocarbon group having 1 to 2 carbon atoms, R" is a substituted or unsubstituted hydrocarbon group having 1 to 3 carbon atoms or an acyl group having 1 to 3 carbon atoms, and
   (C) poly (vinyl acetate), the sum of the percentages A, B, and C equalling 100 percent and on triangular coordinates the proportions by weight of the components (A), (B) and (C) falling in the area defined by:
   (A):(B):(C)=40:42.5:17.5 (percent by weight)
   (A):(B):(C)=17.5:72.5:10 (percent by weight)
   (A):(B):(C)=17.5:60:22.5 (percent by weight)
   (A):(B):(C)=40:35:25 (percent by weight).

2. A coating composition according to claim 1, wherein the tetraalkoxysilane of the formula (I) is tetraethoxysilane.

3. A coating composition according to claim 1, wherein the silicon compound of the formula (II) is methyltrimethoxysilane, vinyltriethoxysilane or vinyltris(β-methoxyethoxy)silane.

4. A coating composition according to claim 1 further containing a solvent.

5. A coating composition according to claim 1 further containing a curing catalyst.

6. A coating composition according to claim 5, wherein the curing catalyst is 1,8-diazabicyclo(5,4,0)-undecene-7.

7. A coating composition according to claim 5, wherein the curing catalyst is trimethylbenzylammonium hydroxide.

8. A process for preparing a coating composition according to claim 1, which comprises hydrolyzing one or more tetraalkoxysilanes of the formula (I) and one or more silicon compounds of the formula (II) in the presence of the poly(vinyl acetate) resin and a solvent.

9. A process according to claim 8, wherein an aqueous solution of hydrochloric acid is used for hydrolyzing.

* * * * *